Jan. 4, 1949.          J. T. GOORLEY          2,457,887
PURIFICATION OF BACITRACIN
Filed April 3, 1947

10 gm BACITRACIN IN 100 cc $H_2O$ – ASSAY 2200 u/cc

ADDED 25 cc SATURATED $(NH_4)_2 SO_4$ SOLUTION (SAT. AMM. SULF.)

TO BRING TO 0.2 SATURATION. THE FLOCCULENT PRECIPITATE (ppt.) WAS REMOVED BY CENTRIFUGATION & DECANTATION (CENT. & DECANT)

| PRECIPITATE I* | LIQUID I |
|---|---|
| SUSPENDED IN 50cc $H_2O$<br>ASSAY 1050 u/cc<br>SOLIDS 3.85% | VOL. 128cc – ASSAY 1260 u/cc<br>ADDED 25cc SAT. AMM. SULF. TO BRING TO 0.33 SATURATION.<br>ppt. CENT. & DECANT |
| PRECIPITATE II | LIQUID II |
| DISSOLVED IN 50cc $H_2O$<br>VERY SOLUBLE – ASSAY 1950 u/cc<br>SOLIDS 4.37% | VOL. 148cc – ASSAY 420 u/cc<br>ADDED 50cc SAT. AMM. SULF. TO BRING TO 0.5 SAT. ppt. CENT. & DECANT |
| PRECIPITATE III | LIQUID III |
| DISSOLVED IN 50cc $H_2O$<br>VERY SOLUBLE – ASSAY 900 u/cc<br>SOLIDS 2.1% | VOL. 200cc – ASSAY 82 u/cc<br>ADDED 35 gm CRYSTALLINE AMM. SULF. TO BRING TO 0.75 SAT. – ppt. CENT. & DECANT |
| PRECIPITATE IV | LIQUID IV |
| DISSOLVED IN 50cc $H_2O$<br>ASSAY 300 u/cc<br>SOLIDS 4.4% | VOL. 215cc – ASSAY 10 u/cc<br>ADDED 35 gm CRYSTALLINE AMM. SULF. TO BRING TO FULL SATURATION.<br>ppt. CENT. & DECANT |
| PRECIPITATE V | LIQUID V |
| DISSOLVED IN 50cc $H_2O$<br>ASSAY 70 u/cc<br>SOLIDS 0.67% | VOL. 228 cc<br>ASSAY 0 u/cc |

*INSOLUBLE. SUSPENSION FILTERED; FILTRATE ACTIVITY 1000 u/cc; FILTERED ppt. VIRTUALLY NO ACTIVITY.

Inventor.
JOHN T. GOORLEY.

By Brown, Critchlow, Flick & Peckham
his Attorneys

Patented Jan. 4, 1949

2,457,887

UNITED STATES PATENT OFFICE 2,457,887

PURIFICATION OF BACITRACIN

John T. Goorley, Hudson, Ohio, assignor to Ben Venue Laboratories, Inc., Bedford, Ohio, a corporation of Pennsylvania Application April 3, 1947, Serial No. 739,227

6 Claims. (Cl. 260—236.5)

This invention relates to the purification of the antibiotic known as bacitracin, more particularly to the separation from crude bacitracin of water-insoluble impurities to produce the antibiotic in a purified form in which it is completely water soluble and of increased potency.

Bacitracin is the product of bacillus belonging to the *Bacillus subtilis* group grown in an appropriate medium. Its characteristics, uses and source are described in various publications such, for example, as a paper by B. A. Johnson, H. Anker and F. L. Meleney in "Science," vol. 102, pages 376–377, entitled "Bacitracin: A new antibiotic produced by a member of the *B. subtilis* group." Its discovery constitutes an important forward step in the field of antibiotics because although it is applicable to the same general purposes as penicillin and streptomycin, it possesses advantages over them. Thus, it is not subject to inactivation by body fluids, by the digestive enzymes, or by short contact with acids and bases. A particular feature of bacitracin is that clinically its effectiveness is much longer than that of penicillin, i. e., the level of bacitracin in the blood is substantially higher after a given length of time than is the case with penicillin.

The methods first used for the production and recovery of this new antibiotic were not fully satisfactory. For instance, the media used gave relatively low yields per unit of broth, and they were relatively expensive. The recovery methods first applied were also unsatisfactory. Thus, it was proposed to recover bacitracin by adsorption from the broth on activated carbon. Although that procedure is applicable satisfactorily to some other antibiotics, experience showed that it was exceedingly difficult to desorb bacitracin once it had been adsorbed on carbon. And attempts to recover the bacitracin from the harvest by solvent extraction showed tendency toward the formation of troublesome emulsions that were difficult to separate or break. The practice of such early recovery processes likewise involved the undesirable handling and ultimate concentration of large volumes of liquids. Consequently, the processes first tried for preparing bacitracin were troublesome, tedious and expensive. Finally, the material recovered by those procedures was of inferior quality in that it has contained colored impurities, was of restricted solubility in water, exhibited high toxicity and undesirable pharmacologic actions, and was of low strength per unit of weight.

In a copending application, owned by the assignee of the present application, Serial No. 703,- 478, filed October 16, 1946 by the present applicant and others, there is described and claimed a method of producing bacitracin that constitutes a major improvement upon the earlier procedures just alluded to. According to that invention, the antibiotic is produced by incubation of a soybean culture medium that has been inoculated with a strain of bacillus of the *B. subtilis* group that produces bacitracin. The application discloses also a procedure for recovery of bacitracin that has been adsorbed from a liquid medium, such a culture medium of any desired type, according to which the bacitracin is desorbed quickly, easily and with relatively small volumes of liquid by eluting the adsorbent with a mixture of a dilute aqueous solution of an acid and an organic solvent that is inert with respect to bacitracin and is present in an amount in excess of its solubility in the solvent. The adsorbent carrying the bacitracin may be any of the types commonly used for similar purposes such, for example, as activated alumina or activated carbon. The acids used are preferably dilute solutions of the strong inorganic acids, while a variety of inert inorganic solvents may be used, preferably the alcohols, and most suitably butanol. As an example of a suitable eluant there may be used a mixture of 0.1 N hydrochloric acid and 12 per cent by weight of butanol. Inasmuch as bacitracin is more easily extracted from neutral aqueous solutions than from acid aqueous solutions, it may be extracted from the eluate by neutralizing the latter and then extracting with, for example, butanol, and the butanol extract may then be treated with an adsorbent to remove impurities, followed by extraction of the liquid with water and an immiscible organic solvent, such as chloroform, which decreases the solubility of bacitracin in butanol so that the bacitracin goes into the water phase which may then be concentrated or carried to dryness.

However produced up to this time, however, experience has shown that bacitracin is not uniformly soluble from batch to batch, or is of varied potency or toxicity due to contained impurities that are not separable by previously know methods and in consequence of which the potency in units per milligram (u./mg.) or per cc. (u./cc.) of solution, are not as high as could be desired.

A primary object of this invention is to provide a method of treating crude, or impure, bacitracin to increase its purity and to separate it wholly from water-insoluble impurities and thus to supply this antibiotic in a form in which it is completely soluble in water, and which is simple, is readily practiced with commonly available apparatus and purifying agents, and is efficient from the standpoint of recovery of the antibiotic material in its purified form.

A further object is to provide such a method of purification that is particularly applicable to the recovery of bacitracin from soybean culture media produced in accordance with the invention of the aforesaid application, and which is simpler and more effective than the recovery method disclosed in the said application.

Other objects will appear hereinafter.

The drawing is a flow sheet illustrative of one example of practice of the preferred embodiment of this invention.

The invention is predicated upon my discovery that bacitracin can be separated from impurities, particularly water-insoluble impurities, by fractional precipitation of aqueous solutions of crude, or impure, bacitracin with ammonium sulfate. This is contrary to expectation because this antibiotic does not follow other classical characteristics of protein categories such, for example, as heat coagulation and dialysis characteristics. By such fractional precipitation I am able not only to separate bacitracin completely from water-insoluble impurities and produce it in a form in which it is completely water-soluble, but also the potency is increased.

In the practice of the invention the bacitracin is treated in aqueous solution. To such a solution there is added ammonium sulfate. Initially the amount of the precipitant added is such as to fractionally precipitate the water-insoluble impurities. The solution is then separated from the precipitate of inert and insoluble material, a further amount of ammonium sulfate is then added to precipitate in purified form a portion of the bacitracin present. The resultant precipitate of bacitracin, wholly free from insoluble impurities, may then be recovered, as by filtration or centrifuging.

This step-wise purification may be effected in more than two stages if desired, as will appear hereinafter.

In carrying out the process just described the crude bacitracin is preferably suspended in distilled water although the process may be applied also to dilute acid solutions, for example 0.1 N aqueous hydrochloric acid.

Ammonium sulfate is desirable for this purpose because it is inexpensive, easy to use, readily available, and salts the antibiotic out in unaltered, or directly soluble, form. Using this reagent it is desirable to effect the initial precipitation of insoluble impurities by bringing the solution to about 0.1 to 0.2 saturation with ammonium sulfate, hold the solution at a low temperature, say about 0° to 5° C., to permit the precipitation, and then separate the precipitate. The solution is then brought to about 0.33 saturation by further addition of the sulfate, again held at a low temperature the precipitated and purified bacitracin thereafter separated and recovered, after which a further amount of ammonium sulfate is added to the solution to bring it to about 0.75 saturation, when it is held at a low temperature until further bacitracin has come down which is then separated and recovered as before. In this way the preponderance of the bacitracin will be recovered in its purified, fully water-soluble form. For maximum recovery, however, the liquid from the last separation may be brought to full saturation with ammonium sulfate whereby after standing at a low temperature a final small amount of the purified bacitracin will be precipitated.

The bacitracin thus recovered may be dried and dispensed in powder form or it may be used to make up sterile solutions of standard strengths.

The attached flow sheet is illustrative of the preferred practice just described as applied to crude bacitracin from a soybean culture medium. 10 grams of the bacitracin assaying 22 units per milligram were added to 100 cc. of water, to provide a solution of 2200 units per cc. (u./cc.). The solution was then treated as shown in the flow sheet, which is self-explanatory. Precipitate I contained all of the water-insoluble impurity, and was insoluble in water. Although it might appear from the assay of this precipitate that a substantial proportion of activity is lost, such need not be the case because the precipitate was suspended in water and filtered, and the filtrate showed upon assaying an activity of 1000 u./cc., whereas the precipitate recovered on the filter showed virtually no activity. Thus from this initial precipitate carrying impurities there may be recovered a substantial proportion of the activity in its water-soluble and purified form.

Precipitates II, III, IV, and V were, of course, purified and completely water-soluble bacitracin. The following tabulation shows the substantially complete recovery of purified bacitratcin that is possible through the practice of this invention.

|  | Activity | | Solids | |
| --- | --- | --- | --- | --- |
|  | Units | Per cent of Total | Gm. | Per cent of Total |
| Precipitate I | 52,500 | 24.0 | 1.93 | 24.5 |
| Precipitate II [1] | 101,400 | 46.0 | 2.27 | 28.8 |
| Precipitate III [1] | 46,800 | 21.0 | 1.09 | 13.7 |
| Precipitate IV | 15,000 | 7.0 | 2.24 | 28.4 |
| Precipitate V | 3,500 | 1.6 | 0.34 | 4.3 |
| Totals | 219,200 | 99.6 | 7.87 | 99.7 |

[1] Solution volume 52 cc. after dissolving precipitate.

The increased potency, as compared with the starting material, of the first and second bacitracin precipitates (ppt. II, ppt. III) is evident from the flow sheet, and virtually complete recovery of the activity is likewise evident from the table. It will be seen also that although the activity was substantially completely recovered, about 20 per cent of the weight of the original material remained in initial insoluble precipitate and the final filtrate, both of which assayed substantially zero activity, thus illustrating how the present method frees the bacitracin-active substance from inert matter.

As will appear from what has been said, bacitracin in initial dry form may be treated in accordance with the invention. The treatment may likewise be applied at various stages in the practice of the method disclosed in the above-identified application; thus it may be initiated at the eluate step, it may be applied to the final water extract, or after partial or complete desiccation of the crude bacitracin carried in the final water extract.

Other changes from the procedure described by way of example may be made also. Thus, in precipitating the antibiotic it is not necessary to do so in the step-wise fashion of the example; thus, the activity may be recovered in satisfactory yield by bringing the filtrate from 0.2 to 0.6 saturation with ammonium sulfate in one step.

Also, although it is preferred to conduct the precipitation at low temperatures, e. g., in a refrigerator, this refinement is not necessary.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. That method of purifying crude bacitracin which comprises providing an aqueous solution of crude bacitracin, adding ammonium sulfate to said solution to partially saturate it and fractionally precipitate inert impurities substantially insoluble in water, separating the solution from the precipitate of inert material, adding further ammonium sulfate to the separated solution to precipitate bacitracin in purified and water-soluble form, and recovering the precipitate of purified bacitracin.

2. A method according to claim 1 in which the solution separated from said purified bacitracin is treated at least once more with a further amount of ammonium sulfate to precipitate a further amount of purified and water-soluble bacitracin, and the bacitracin precipitate is recovered.

3. That method of purifying crude bacitracin which comprises providing an aqueous solution of crude bacitracin, adding ammonium sulfate to said solution to partially saturate it and fractionally precipitate inert impurities substantially insoluble in water, holding the solution at a low temperature, then separating the solution from said precipitate of inert material, adding a further amount of ammonium sulfate to the separated solution and again holding at a low temperature to precipitate bacitracin in purified and water-soluble form, and recovering the precipitate of purified bacitracin.

4. That method of purifying crude bacitracin which comprises providing an aqueous solution thereof, adding ammonium sulfate to about 0.1 to 0.2 saturation, holding the resultant solution at a low temperature, and thereby precipitating impurities substantially insoluble in water, recovering the precipitate from the solution and increasing the concentration of ammonium sulfate in the solution to about 0.33, again holding at a low temperature and thereby precipitating bacitracin in purified and water-soluble form, recovering the precipitate of purified bacitracin from the solution, and further increasing the concentration of ammonium sulfate at least once with intermediate holding at a low temperature and with subsequent separation of precipitated purified bacitracin to thereby recover at least one further amount thereof.

5. That method of purifying crude bacitracin which comprises providing an aqueous solution thereof, adding ammonium sulfate to about 0.1 to 0.2 saturation, holding the resultant solution at a temperature between about 0° to 5° C. and thereby precipitating impurities substantially insoluble in water, recovering the precipitate from the solution and increasing the concentration of ammonium sulfate in the solution to about 0.33, again holding at a temperature between about 0° and 5° C. and thereby precipitating bacitracin in purified and water-soluble form, separating the precipitate of purified bacitracin from the solution, and further increasing the concentration of ammonium sulfate at least once with intermediate holding at a temperature between about 0° and 5° C. and subsequent separation of precipitated purified bacitracin to thereby recover at least one further amount thereof.

6. A method according to claim 5 in which the solution is eventually fully saturated with ammonium sulfate.

JOHN T. GOORLEY.

REFERENCES CITED

The following references are of record in the file of this patent:

Hoogerheide: J. Franklin Inst., vol. 229, pp. 677–680 (1940).

Hawk et al.: "Practical Physiological Chemistry," 12th ed.; p. 157 (Blakiston Co., Phila., 1947).

Johnson et al.: "In vivo and in vitro Laboratory Observations on Bacitracin" (paper presented at Conference on Antibiotic Research in Washington, D. C., on Jan. 31, and Feb. 1, 1947, under auspices of Antibiotics Study Section of the National Institute of Health).